United States Patent [19]

Rodgers

[11] 4,022,971
[45] May 10, 1977

[54] METHOD AND APPARATUS FOR CONVERTING THE LOCATION AND MOVEMENT OF A MANUALLY CONTROLLED INSTRUMENT INTO CORRESPONDING ELECTRICAL SIGNALS

[75] Inventor: James L. Rodgers, Tempe, Ariz.
[73] Assignee: Talos Systems, Inc., Scottsdale, Ariz.
[22] Filed: Apr. 28, 1976
[21] Appl. No.: 681,334

Related U.S. Application Data

[63] Continuation-in-part of Ser. No. 600,820, July 31, 1975, Pat. No. 3,983,322.

[52] U.S. Cl. .......................... 178/19; 340/347 AD
[51] Int. Cl.² ....................................... G08C 21/00
[58] Field of Search ...................... 178/18, 19, 20; 340/146.3 SY, 347 AD; 33/1 M

*Primary Examiner*—Thomas A. Robinson
*Attorney, Agent, or Firm*—Cahill, Sutton & Thomas

[57] ABSTRACT

A system is disclosed for converting the location and movement of a manually controlled instrument into corresponding electrical signals. The manually controlled instrument responds to the phase and frequency of an electrical field that varies to represent position information on an orthogonal writing grid. A single, phase-locked loop is utilized to produce both a first signal corresponding to the instrument location along an x-axis and a second signal corresponding to the instrument location along a y-axis. The first and second signals both represent the differential between pairs of related absolute signals. The differential signals are independent of normal signal variations and other error sources. The field is generated by first selecting sets of conductors that are positioned orthogonally with respect to each other. Signals are then applied to the respective sets of conductors to thus generate an electric field at the location of the intersection of the orthogonal sets.

8 Claims, 8 Drawing Figures fig. 1 fig. 2 fig. 3 fig. 4 fig. 5 fig. 6 fig. 7 fig. 8

METHOD AND APPARATUS FOR CONVERTING THE LOCATION AND MOVEMENT OF A MANUALLY CONTROLLED INSTRUMENT INTO CORRESPONDING ELECTRICAL SIGNALS

This application is a continuation-in-part of co-pending patent application Ser. No. 600,820, filed July 31, 1975, now U.S. Pat. No. 3,983,322, which issued Sept. 28, 1976.

FIELD OF THE INVENTION

This invention relates to information conversion systems, and more particularly, to a system for converting the location and movement of a manually controlled into corresponding electrical signals.

DESCRIPTION OF THE PRIOR ART

In prior art systems for converting the position of an instrument into an analagous electrical signal, separate channels are utilized to produce signals corresponding to the orthogonal axes of a writing table. For example, in U.S. Pat. No. 3,767,858, the mechanical position of a writing pen is converted into an analogous electrical signal by sensing the phase of a field set up in a writing table at the location of the pen. The sensed signal is a composite of the signals corresponding to the pen position on the two orthogonal axes of the writing table. The composite signal is separated into individual signals which each pass through phase-locked loops to provide output signals representative of the pen position along each axis of the writing table.

Because separate channels are utilized in the above patent to produce the paired output signals, it is important to prevent any interference or interaction between the two channels. Additionally, in the above patent, the two signals corresponding to the pen position along the two axes are combined for transmission to a receiver which utilizes the position information. The two distinct signals are frequency modulated onto a carrier-subcarrier signal. As a result, an inherent inequality is introduced because the signal carried by the subcarrier cannot match the performance of the carrier signal. Not only does the subcarrier have a different inherent delay, but also it is less effectively isolated from phase variations. Unless a compensating circuit is utilized, data information relating to one axis will be distorted by comparison with the data corresponding to the other axis. Furthermore, any drift or variance inherent in the system circuitry produces a corresponding error in the signals being transmitted because the transmitted data utilizes a signal having an absolute value. Additionally, any variation between the circuits that process the signals of the two distinct channels will produce error or distortion in the transmitted position indicative data.

Because the pen senses the signal appearing at a position on the writing table, any error or distortion in the signal sensed will give a false indication of the pen location. Commonly, a writing material such as paper is placed between the writing table and the pen. This writing material introduces capacitive and dielectric effects at the pen-table interface. Any variation in the properties of the writing material will affect the sensed signal and produce erroneous data regarding the pen position. A related error results if the pen is held in a position other than perpendicular to the writing surface of the table.

To facilitate transmission of the position indicative data over telephone lines, and to indicate pen movement and "pen up" or "pen down" information, a system was disclosed in U.S. Pat. No. 3,851,097 in which the two distinct signals representing the orthogonal position information and the signals representing related pen position information are all frequency modulated onto a carrier for transmission to a distant location. Although this system permits signal transmission to a distant location over the narrow frequency band of a telephone line with minumum transmission error and distortion, it does nothing to reduce the errors inherent in the generation of the position responsive signals. Such errors result from normal variations in system components, temperature effects, noise and other interference and random effects. These normal variations produce erroneous data since they represent variations from an absolute standard, just as the signals indicative of the pen position are variations from an absolute standard. Because of the transmission characteristics of telephone lines, the timing is altered between the carrier and subcarrier signals which further imbalances the information being transmitted over the two channels. Since the variations are not predictable quantitatively, they cannot be compensated for readily.

Another significant limitation of the above patents is found in the difficulty encountered in aligning equipment at a distant location with the writing table at the transmitting location. Where it is desired to utilize the electrical signals corresponding to the pen position to re-create the pen movement at the distant location, it is necessary to insure that the image area of the transmitting equipment is aligned with the image area of the reproducing equipment at the receiving location. Unless this is accomplished, even data that is transmitted error-free may produce meaningless information where there is no position at the receiving location that correlates to the transmitted data. Where multiple receivers are used, the alignment problem becomes compounded.

Such systems as disclosed in the above patents are also restricted in the signal resolution they can provide. The dynamic range of such systems is a function of the deviation of signals from a nominal value and the ability of the equipment to distinguish such signal deviation and correlate it to position responsive information.

U.S. Pat. Nos. 3,530,241; 3,591,718; 3,624,293; and 3,670,103 disclose a variety of embodiments of systems for converting the position of an instrument on a writing surface into electrical signals corresponding to that position. These embodiments are all subject to some or all of the disadvantages and limitations set forth above. Further, when the size of the surface upon which the instrument is positioned is large, significant problems relating to tolerances are presented by the prior art. For example, if the surface is the size of a small note pad, the resolution of the instrument position (i.e. the accuracy with which the instrument's position can be determined) may be acceptable. However, when the surface assumes the dimension, for example, of a large drafting board, the tolerances which may have been acceptable with a small pad now become cumulative and become increasingly less acceptable as the size of the surface increases.

It is therefore an object of the present invention to provide a method and apparatus for producing data signals corresponding to the position on a surface of a manually operated instrument wherein the position of the instrument may be determined within predetermined tolerances without regard to the size of the surface upon which the instrument is positioned.

It is another object of the present invention to provide a method and apparatus for determining the position of an instrument of a surface by generating signals corresponding to the instrument's position along orthogonal axes.

It is still another object of the present invention to provide a method and apparatus for determining the position of an instrument on a surface by first determining an active area in the vicinity of the instrument and subsequently energizing orthogonal sets of conductors to generate an electric field to determine the position of the instrument within the active area.

These and other objects of the present invention will become apparent to those skilled in the art as the description thereof proceeds.

SUMMARY OF THE INVENTION

Briefly stated, and in accordance with one embodiment of the present invention, a writing table including an orthogonal conductor grid produces a pair of variable characteristic signals in response to two different signal patterns applied to the grid. The paired signals are unique at each position of the writing table. As a manually operated instrument moves across the writing table, it senses the changing signals. The position of the instrument is indicated by the correlation between a first signal representing its position relative to one axis of the orthogonal grid and a second signal representing its position relative to the other axis of the grid. The first and second signals are each produced by comparing the sensed response to the two different signal patterns applied to the grid. By utilizing the differential between the compared signals to indicate the position of the instrument of the grid, the system does not respond to normally encountered signal variations.

The conductors are spaced along the writing table and are connected to conductor selection networks; the selection takes place by digitally addressing "sets" of conductors comprising three parallel conductors. When the X conductor set and Y conductor set have been chosen, the intersection of the conductor sets defines an active area within which the instrument is located. The varying signals are then applied to the conductors of the orthogonal sets of conductors. The differential signal indicating the position of the instrument in the active area produces an output voltage which is supplied to an analog-to-digital convertor to provide a digital representation of the position of the instrument within the active area. The digital code utilized to select the conductor sets then defines the area within which the instrument may be found while the converted digital code provides the precise location within the active area.

DETAILED DESCRIPTION OF THE ILLUSTRATIVE EMBODIMENT

Figure 1:
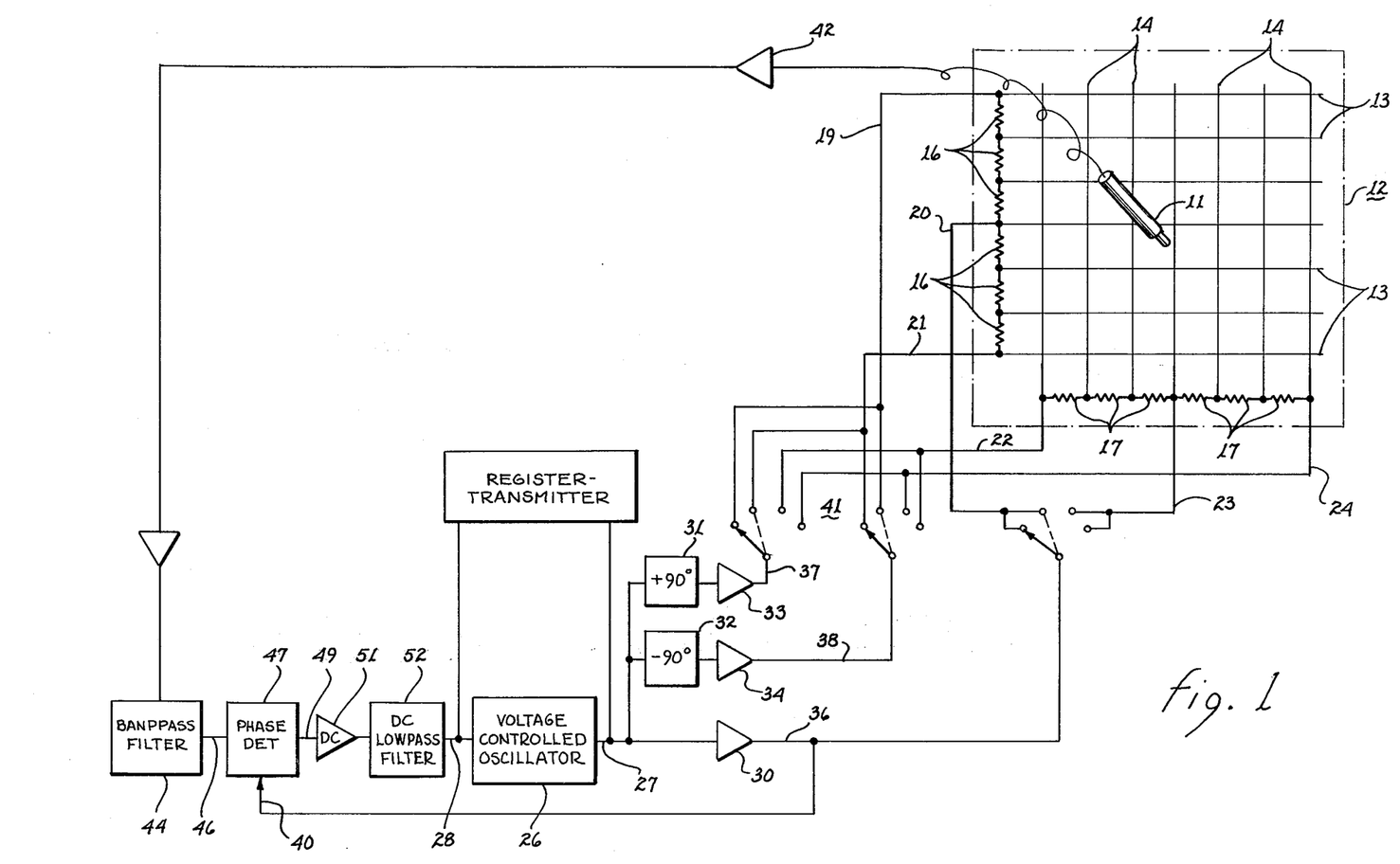
FIG. 1 is a schematic representation of a portion of a system embodying the present invention.

The significant components of a system to convert the position of a manually operated instrument into corresponding electrical signals are shown in FIG. 1. Such a system includes a pen and sensor 11 which moves across a writing grid 12 under manual control. Grid 12 includes a first group of parallel conductors 13 located along one axis of the orthogonal grid. A second group of parallel conductors 14 is positioned along the other axis of the grid. To prevent conductors 13 from contacting conductors 14, they are placed in parallel but slightly spaced apart planes. A solid writing surface is positioned over both groups of conductors 13 and 14 to support writing material which may be marked by pen 11.

The complete operation of pen 11 was disclosed in U.S. Pat. No. 3,886,311. No attempt will be made here to fully explain the features of the pen, but merely to explain its function in this system. Pen 11 transmits signals that indicate its position relative to the writing surface. When pen 11 is "up" or off the surface of the writing surface, that position is indicated by a distinctive signal. Similarly, when the pen is "down" on the surface, another distinctive signal indicates that face. Such "pen drop" information is transmitted, as fully explained in the patent identified above, and may be utilized at some distant location to duplicate the position of the pen. Alternatively, an instrument other than a pen may be utilized; for example, in some applications a device known as a "cursor" may be used. The latter device may take a variety of forms and will usually comprise an instrument that will rest upon surface of the tablet and will incorporate the necessary field detecting antenna. The pen or other instrument detects the existence of the field even if it isn't on the surface; the detected field will generate an indication that the pen or instrument is in the "proximity" of the surface, but the generated signal will not be precise enough to determine the location of the instrument. This "proximity" signal will be utilized as will be explained more fully hereinafter to "prepare" the apparatus to select the appropriate set of conductors. Pen 11 also responds to signals from grid 12 as will be explained later in detail. These signals are indicative of the position of pen 11 relative to the orthogonal axes of grid 12. These position indicative signals may also be transmitted to a distant location to permit the movement and position of pen 11 to be traced at the distant location.

A plurality of equal amplitude, but phase displaced signals are applied to the conductors of grid 12. Due in part to the effect of resistors 16 which connect between conductors 13 and resistors 17 which connect between conductors 14, an electrostatic field is established across the writing surface of grid 12. Pen 11 includes a pickup element that senses the electrostatic field. Since the field varies across the writing surface of grid 12, the sensed field produces signals that are uniquely associated with the position of pen 11 on grid 12.

Because the control circuitry of this system is a closed loop, as will be explained, there is no "start" or "end" to assist in its explanation. Accordingly, this explanation of the system begins at a voltage controlled oscillator 26 merely because it is centrally located. Oscillator 26 has a nominal frequency but its output frequency may be varied in response to the application of a DC voltage at its input as will be explained. For illustrative purposes only, the nominal frequency of oscillator 26 will be selected as 10,000 Hz. Output 27 of oscillator 26 connects to an amplifier 30. Output 27 also connects to a phase shifter 31 and to a phase shifter 32. Phase shifter 31 alters the phase of the signal on output 27 by +90° while phase shifter 32 alters the phase of the signal on putput 27 by −90°. The output from phase shifter 31 connects to an amplifier 33 and the output of phase shifter 32 connects to an amplifier 34.

The amplitude of the output signals from amplifiers 30, 33 and 34 are equal to each other, although they differ in phase relationship at their respective outputs 36, 37 and 38. Output 36 is in phase with output 27 while output 37 leads by 90° and output 38 lags by 90°. Outputs 36, 37 and 38 connect to conductors 13 and 14 through switching means whose function will be explained later in detail. Although this switching means has been indicated as a four-position, three-gang mechanical switch 41 for ease of explanation, it should be understood that this is not a requirement of the system. In fact, a more common embodiment should be to utilize electronic switching elements to control the connections between outputs 36, 37 and 38 and conductors 13 and 14. However, because it is easier to visualize the connections that result, switch 41 will be utilized for illustrative purposes.

The signal that is sensed by pen 11, as was explained above, is amplified by a line amplifier 42. The output of amplifier 42 connects to a bandpass filter 44. The output of filter 44 is applied to lead 46 which connects to the input to a phase detector 47. A second input 40 originating at output 36 from amplifier 30 also connects to phase detector 47. The output from phase detector 47 connects to a lead 49 which provides the input to a DC amplifier 51. Amplifier 51 connects through a DC lowpass filter 52 to the input 28 of oscillator 26.

With the moveable contacts of switch 41 in the position shown in solid line in FIG. 1, output 36 connects to a center input 20 of grid 12. Outputs 37 and 38 connect respectively to a top input 19 and to a bottom input 21 of grid 12. Inputs 19, 20 and 21 connect to conductors 13 of grid 12 to establish the variable y field across the grid. As pen 11 moves in the y direction, or up and down on grid 12, it will sense changes in this variable field.

Figures 2, 3, 4:
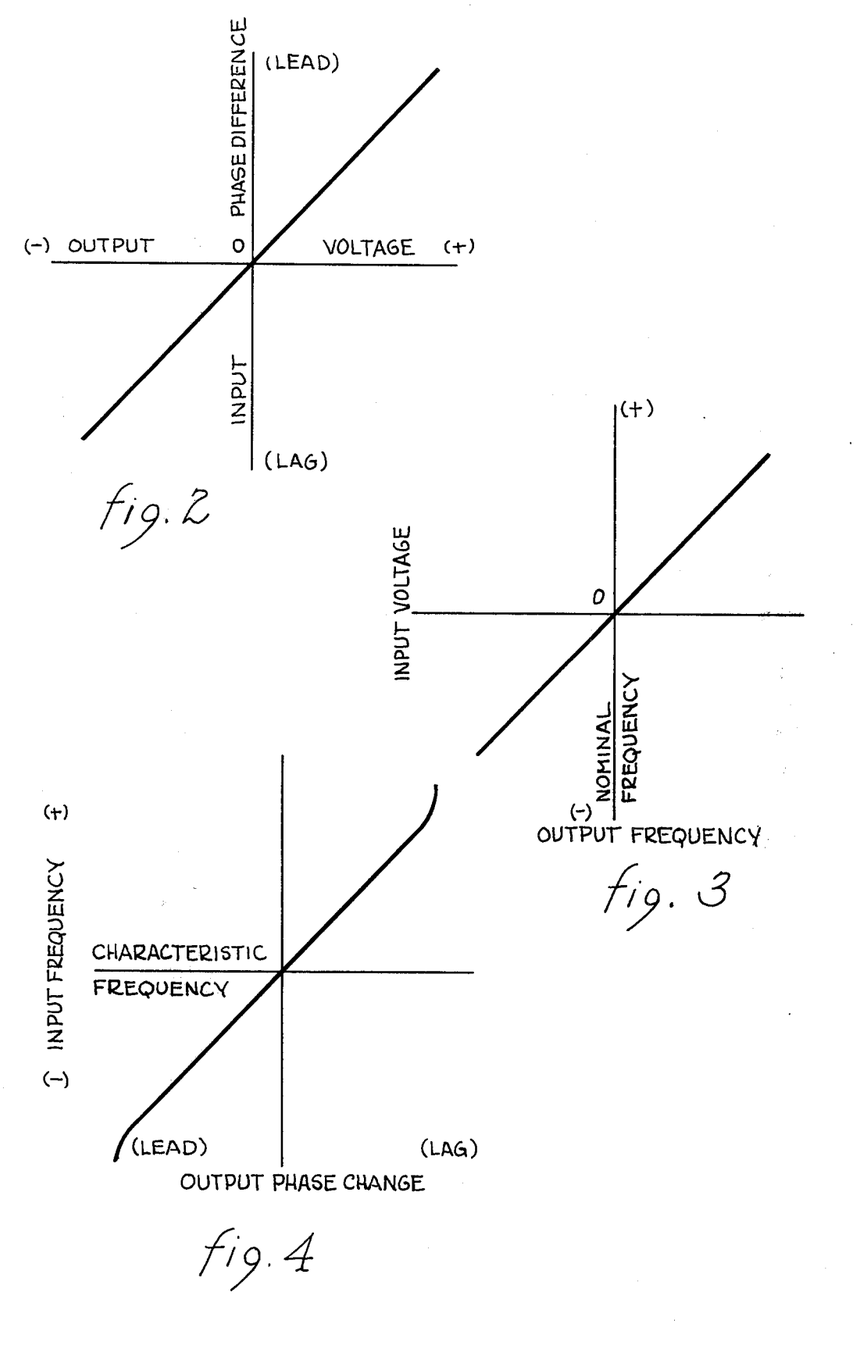
FIGS. 2 through 4 are graphical representations of signal characteristics at indicated points in the schematic of FIG. 1.

If pen 11 is positioned directly over the center conductor of conductors 13, which connects to input 20, a 10,000 Hz signal in phase with output 36 will be sensed. As will become apparent as this explanation continues, output 36 serves as a reference signal for the system and the phase of all signals is determined relative to the phase of the signal on output 36 and lead 40 to which it connects. The sensed signal is transmitted through amplifier 42 and filter 44 to be applied via lead 46 to the input to phase detector 47. Since the signal applied to phase detector 47 via lead 46 is in phase with the signal at the input from lead 40 (which connects to reference output 36), phase detector 47 will have no output signal. Phase detector 47 produces an output signal, a DC voltage, in response to the phase difference between the input signals applied at leads 40 and 46. The relationship between the input and output signals of phase detector 47 is shown graphically in FIG. 2. It can be seen that no output voltage results when the signals at the two inputs 40 and 46 have a predetermined relationship to each other. With no output signal present from detector 47, the input 28 to oscillator 26 has no voltage appearing thereon. This represents an equilibrium condition and the output frequency of oscillator 26 will not change. The equilibrium condition of oscillator 26 is indicated in FIG. 3 where the graphical representation between input voltage and output frequency is shown.

If pen 11 could be instantaneously moved to a position near the top conductor of conductors 13, it would sense a 10,000 Hz signal that is out of phase relative to the reference signal appearing on lead 40. The sensed signal will be amplified by amplifier 42 and applied to the input to bandpass filter 44. Because the applied signal is at the characteristic frequency of filter 44, it will not be attenuated. However, filter 44 not only acts to attenuate the amplitude of applied signals outside its characteristic frequency, it also acts as a frequency to phase translator in accordance with the graphical representation of FIG. 4. As FIG. 4 shows, there is no phase change at the characteristic frequency of filter 44. However, at lower frequencies applied to the input to filter 44, a lead phase change results on its output lead 46. Similarly, if a higher frequency is applied to filter 44, the output lead 46 will carry a lagging phase signal. The phase of the signal applied to the lead 46 due to the present position of pen 11 will be out of phase with the reference signal 40. Since a leading phase signal was applied at input 19, it is a leading phase signal applied to phase detector 47 via lead 46. This phase differential produces an output voltage in accordance with FIG. 2, resulting in a position DC voltage being applied to input 28 of oscillator 26. The application of a positive voltage to oscillator 28 will cause its output frequency to increase in accordance with the relationship shown in FIG. 3.

Assuming that the output frequency of oscillator 26 increases to 11,000 Hz and that this is an equilibrium position relative to the phase of the signal appearing at the pen position, the signals in the closed loop beginning at oscillator 26 and extending through switch 41, grid 12, pen 11, filter 44, phase detector 47 and back to oscillator 26 will become stabilized. This condition, referred to as a "phase y" signal, will be indicative of the position of pen 11 on grid 12. As will be explained later more fully, either the voltage of the signal appearing on lead 28 or the frequency of the signal appearing on lead 27 may be correlated to the position of pen 11. Both leads connect as inputs to a register-transmitter 55, although either lead would contain sufficient data by itself. The phase y signal will be stored in the register portion of register-transmitter 55 for later use, as will be explained.

Switch 41 now advances to the next position, as shown in dotted position on FIG. 1. The lagging and leading phase inputs to grid 12 are now reversed. Center input 20 continues to carry a signal in phase with reference lead 40; however, top input 19 now carries a lagging signal, while bottom input 21 carries a leading signal. Pen 11 is still positioned near the top conductor of conductors 13. As a result, the phase of the induced signal that is sensed by pen 11 will reverse itself in sign. This will produce an out-of-equilibrium condition and the components will again act to offset that condition. Because of the phase difference now appearing between lead 46 and reference lead 40, a negative voltage will appear on input lead 28. This will cause the output frequency of oscillator 26 to go below its nominal frequency. When equilibrium conditions once again prevail, the signals appearing on leads 27 and 28 will be indicative of this second condition, called "inverted phase y." The significance of this second signal will also be explained later in detail.

Switch 41 is next advanced to its third position, in a clockwise direction as shown in FIG. 1. Output lead 36 connects to a middle input 23 of conductors 14 while a left input 22 connects to the leading phase signal of output 37 and a right input 24 connects to the lagging phase signal of output 38. None of the outputs 36, 37 and 38 connect to any input to conductors 13 so that any signal sensed by pen 11 is now a result of its position relative to conductors 14 and the field produced by the signals now appearing thereon. The control loop will again cause the frequency of oscillator 26 to vary until an equilibrium condition, called "phase $x$," is obtained. The phase $x$ signal is indicative of the position of pen 11 along the $x$ axis, or in the left-right direction across conductors 14. Again, the phase $x$ signal's significance will be explained later in detail.

The last position of switch 41, before it returns to its initial position for a subsequent operation cycle, is shown in the extreme clockwise position. Similar to the phase reversal that occurred between the phase $y$ and inverted phase $y$ conditions, the connections to inputs 22 and 24 are reversed. This phase reversal produces an out-of-equilibrium condition. Once the control loop adjusts to obtain equilibrium, a signal indicative of the "inverted phase $x$" condition may be noted. The significance of the four signals, phase $y$, inverted phase $y$, phase $x$ and inverted phase $x$ will not be explained.

If the phase $y$ and inverted phase $y$ signals are compared with each other, either a voltage difference is obtained from a comparison of the lead 28 signals or a frequency difference is obtained from a comparison of the lead 27 signals. For purposes of illustration, the frequency signals appearing on lead 27 will be discussed. If the frequency corresponding to phase $y$ is 11,000 Hz and the frequency corresponding to inverted phase $y$ if 9,000 Hz, the comparison of the two signals produces a +2,000 Hz differential signal. This differential signal is as unique to the position of pen 11 on grid 12 as would the single signal used in the prior art. The prior art signal is in fact a comparison signal too, except it is the differential between zero and the determined value. The significance of the differential signal in accordance with the present invention can be appreciated if it is assumed that the nominal frequency of oscillator 26 has drifted from its design value of 10,000 Hz to a true value of 10,050 Hz. This drift could result from effects of temperature, component tolerance, etc. Utilizing the prior art approach, a single signal corresponding to the position of pen 11 on grid 12 would be obtained. However, the signal would include an error component since a comparison with an absolute standard is employed. Utilizing the differential signal approach of the present invention, no resultant error would be introduced. Each reading, phase $y$ and inverted phase $y$, would include the influence of the error produced by the drift of oscillator 26. However, the effects of the error would be opposite in character due to the phase reversal between the input signal conditions. As a result, each signal would include an absolute error, but there would be no differential error because the influences would be cancelled.

A related advantage is obtained from use of the differential signal rather than a single absolute signal. It is advantageous to have a symmetrical output from the writing grid. That is, a position located a first distance from the center of the grid should create a signal equal to that produced at a second position located the same distance as the first from the center, but in the opposite direction. Because bandpass filters are usually non-symmetrical, prior art systems have been unable to provide symmetrical output information directly but relied on compensating circuits to produce the effect. In the system of the present invention, such compensation is unnecessary. Rather, the differential signal corresponding to a position on either side of the center will include the effects of both high and low frequency components (lagging and leading phase signals). Any effects of the non-symmetrical characteristics of the bandpass filter will cancel each other. As a result, the position of a pen located a fixed distance above, below, left or right of center will produce symmetrical output signals.

Isolation from nominal variations in the signals applied to grid 12 and processed by the closed control loop, similar to that obtained with reference to the phase $y$ and inverted phase $y$ signals, results from a comparison of the phase $x$ and inverted phase $x$ signals if the differential between them is utilized rather than the absolute signal values. Related to this error isolation resulting from nominal variations in the circuitry, a second type of error isolation results where the data obtained is transmitted to a remote location. By transmitting the absolute value signals to the remote location and then obtaining the differential of them, the differential signal will cancel the influences of any transmission error affecting both signals, such as frequency shifts in the transmission line, etc.

It will be noted that the same closed control loop that established equilibrium conditions for the $y$ oriented signals also established equilibrium conditions for the $x$ oriented signals. As a result, an relative errors that might have resulted from nominal variations in the similar circuitry that produced $x$ and $y$ signals in the prior art has now been isolated with the present invention. If an error or variation is introduced, it would be equally present in the $x$ and $y$ direction signals. As a result, no relative distortion would be introduced thereby.

Bandpass filter 44 has been disclosed as having a single characteristic frequency. Actually, filter 44 could beneficially have multiple poles and be stagger-tuned in frequency to produce a composite filter having a wide bandwidth and a linear phase to frequency relationship.

The system thus far disclosed is comparable to a servo system having a closed loop with the signal on lead 40 providing feedback information. By converting the frequency change of oscillator 26 into a phase shift signal, filter 44 effectively closes the servo loop. Filter 44 also acts as a frequency to phase connector and as an attenuator of the phase shift signal that is applied to the phase loop. However, without filter 44, the changing frequency resulting from movement of pen 11 across grid 12 would have no significance and the loop would remain open. Utilizing the frequency to phase translation capacity of filter 44, the filter acts as a reference for the system, allowing it to function as a true servo system. Accordingly, if the phase shift across grid 12 is increased to increase signal resolution and reduce errors, a smaller percentage of the signal must be applied to the phase-locked central loop to prevent system instability. This will reduce the effective loop gain which increases system errors. The increased dynamic range of grid 12 resulting from the increased phase shift can be compensated for by either increasing the number of poles in filter 44 or by narrowing its bandwidth.

Figure 5:
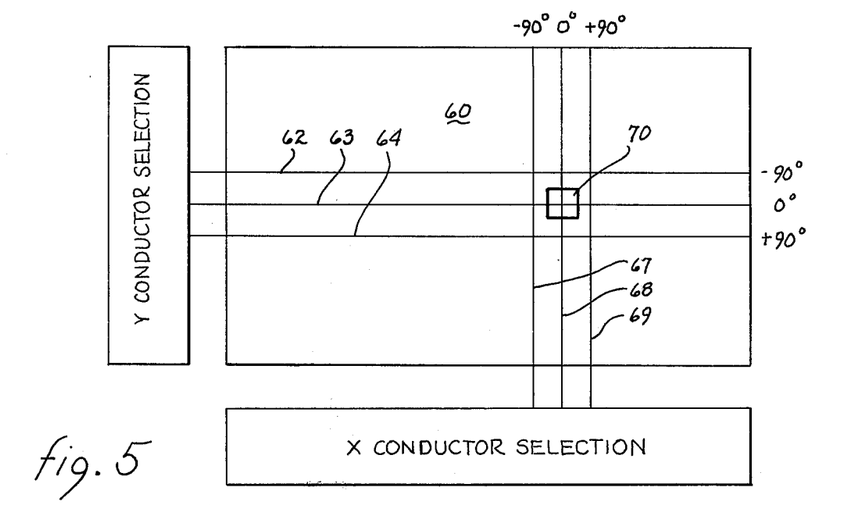
FIG. 5 is a schematic representation of a large writing table showing an X conductor set and a Y conductor set, each having been selected by their respective selection networks, and showing an active area as defined by the select conductor sets.

The system thus far described provides a closed loop servo technique for determining the position of the instrument within an active area. Referring to FIG. 5, a writing table 60 is shown which may take the form of a drafting table having dimensions relatively large in comparison to a writing table. Typically, the writing table 60 may be 60 inches in length and 48 inches in width. For simplicity, only two sets of conductors are shown in FIG. 5. Further, to avoid confusion, those conductors that are utilized to determine the position of the instrument in the X direction are referred to as X conductors and those conductors utilized to determine the position of the instrument in the Y direction are referred to as Y conductors (even though the respective conductors extend in a direction which would appear the opposite of their designation). Conductors 62, 63 and 64 comprise a conductor "set" which are energized to develop the electric field as set forth above. As shown in FIG. 5, conductor 63 is energized with a signal having a reference phase while conductors 62 and 64 are energized with lagging and leading phase signals. Further, the phase of the signals applied to conductors 62 and 64 will be alternated as described above.

Conductors 67, 68 and 69 comprise the X conductor set which have been energized with signals having the phase relationships described in connection with the Y conductor set. For purposes of illustration, the present embodiment was chosen having the conductor sets comprising three conductors with a spacing of one inch between the respective conductors. Thus, the distance between conductors 67 and 69 and between conductors 62 and 64 is 2 inches. An active area 70 is thus defined by the intersection of the X and Y conductor sets. The selection of the conductor sets is performed digitally as will be described more fully hereinafter.

Figure 6:
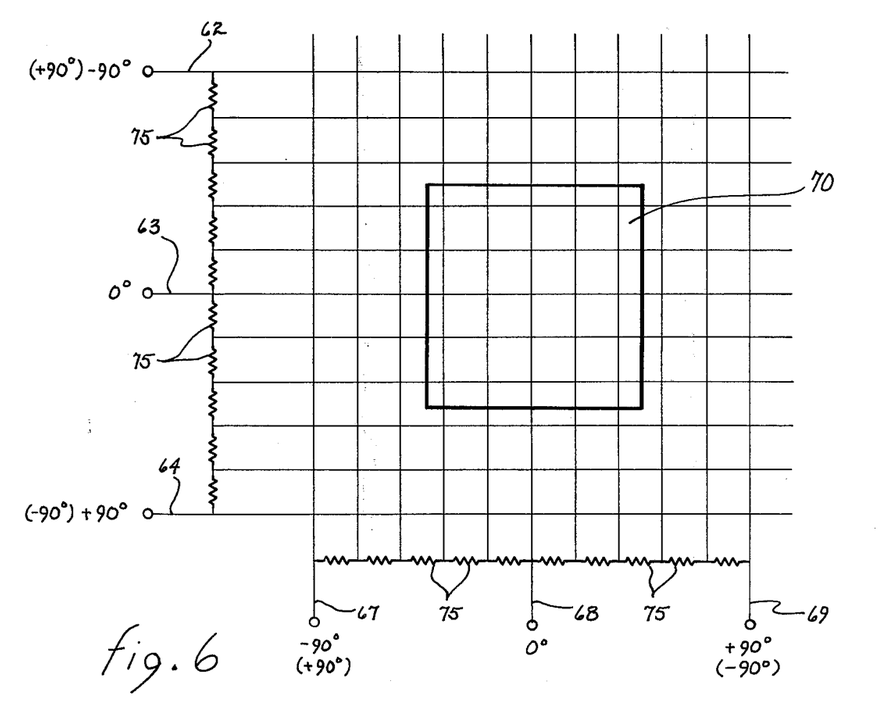
FIG. 6 is an enlarged view of the active area shown in FIG. 5.

Referring to FIG. 6, the active area 70 of FIG. 5 is shown in an enlarged scale and the conductors positioned in the surface of the writing table are shown. It may be seen that conductors 67, 68 and 69 are positioned with one-inch spacing as are conductors 62, 63 and 64. While conductors 62–64 and 67–69 are the conductors connected to receive the field-generating signal, the respective conductors are interconnected by a plurality of resistors 75 to other conductors connected in parallel. Thus, in the embodiment chosen for illustration in FIG. 6, there are five conductors per inch. The active area 70 is defined by the intersection of the signal applied to conductors 63 and 68 (zero phase shift) and extends to form a one-inch square. Thus, when the writing instrument is placed at any point within the active area 70, the signals apply to conductors 67–69 and 62–64 will result in the generation of an electric field which will be detected by the instrument and fed back into the system in a closed loop. As described above, the phase relationship of the outer conductors of the set (conductors 67 and 69) of the X conductors as well as the outer conductors of the Y conductor set (conductors 62 and 64) will alternate from +90° to −90°. The alternation of the phase relationships of the outer conductors of the conductor set produces a different signal as described above which will be an indication of the position of the instrument within the active area along an axis perpendicular to the conductors of the conductor set. When orthogonally related conductor sets are utilized, the precise position of the instrument within the active area is determined. The selection of the active area 70 takes place as a result of the selection network as will be described more fully hereinafter.

Figure 7:
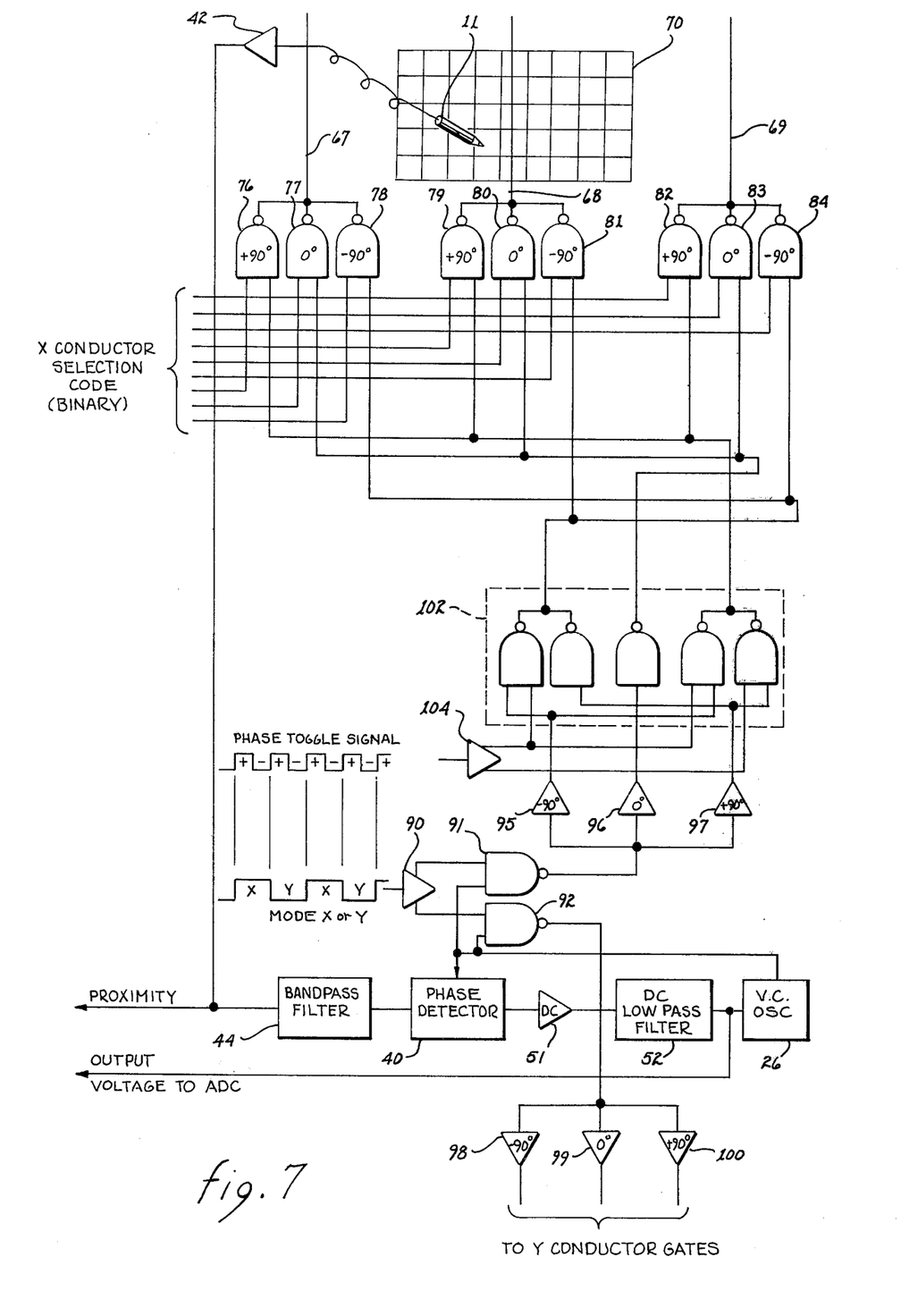
FIG. 7 is a schematic diagram showing the digital selection of a set of conductors and showing the switching of the signals to derive position information.

Referring to FIG. 7, the active area 70 is shown in relation to conductors 67, 68 and 69 of the X conductor set. For simplicity, the Y conductors and the writing table have been eliminated from FIG. 7; it will be understood by those skilled in the art that the selection process to be described in connection with the X conductor set is identical to that utilized for Y conductor sets. Similarly, the conductors positioned between conductors 67, 68 and 69, which conductors are interconnected by series resistors as described in connection with FIG. 6, has been eliminated for clarity of description. Each of the conductors 67–69 is connected to receive any one of three signals, the first of which is at a predetermined frequency with a reference phase, the second of which lags the first by 90° and the third of which leads the first by 90° in a manner described previously in connection with FIG. 1. The selection of the specific conductor set is determined by a conductor selection code that is applied to conductor gates 76 through 84. The gating arrangement, shown in FIG. 7, has been chosen for simplicity of description; it will be obvious to those skilled in the art that a great variety of switching schemes can be utilized while providing the necessary gating function. The signals applied to the gates 76 through 84 are derived from the voltage controlled oscillator 26 which corresponds to the oscillator by the same reference numeral in FIG. 1. The bandpass filter 44, the phase detector 40, the DC amplifier 51, and the lowpass filter 52 each correspond to the elements having the same reference numerals as in FIG. 1. The operation of these elements has previously been described and will not be repeated here. However, it may be noted that the output utilized in FIG. 7 is the voltage derived from the lowpass filter 52 that is used for controlling the oscillator 26. The signal from the oscillator 26 is gated by a mode switch 90 through gates 91 and 92 to phase shifting elements 95 through 100. Thus, the signal derived from the oscillator 26 is applied alternately to the elements 95 through 97 for ultimate application to the X conductors and to elements 98 through 100 for ultimate application to the Y conductors. As stated previously, the present description will be limited to the selection of the X conductors and X conductor sets since the Y conductor selection is identical thereto. The signal from the oscillator 26 is appropriately phase shifted by the elements 95, 96 and 97 and applied through gating network 102 to the gates 76–84. Basically, the signal applied from element 96 to gates 76–84 remains at the reference phase while the phase shifted signals from elements 95 and 97 are alternately applied to the corresponding X conductor gates through utilization of a phase toggle signal applied to the phase toggle switch 104.

Whenever the instrument 11 approaches the active area 70 and comes close enough to detect the presence of an electric field, the signal derived from the instrument may not be strong enough for the system to lock into the position of the instrument; nevertheless, the existence of any such signal, referred to as a proximity signal, is derived from the instrument and used in the system as will be described more fully hereinafter. Thus, the portion of the system shown in FIG. 7 utilizes an X conductor selection code to enable the gate of three X conductors forming a conductor set. Enabling these conductors passes the electric field generating signal thereto to effectively establish the active area 70. Signals fed back from the writing instrument 11 result in the generation of a different signal as described in connection with FIG. 1. The signal is taken from that portion of the system shown in FIG. 7 as output DC voltage. The application of the oscillator signals to the respective conductors of the X conductor set occurs only during the gating of the signals to those conductors during the X mode; further the phase shifted signals (+90° and −90°) are alternated between the outer conductors of the conductor set through the utilization of a phase toggle signal which provides for the switching of a −90° signal to a +90° signal once during each period in each of the modes (mode X or mode Y).

Figure 8:
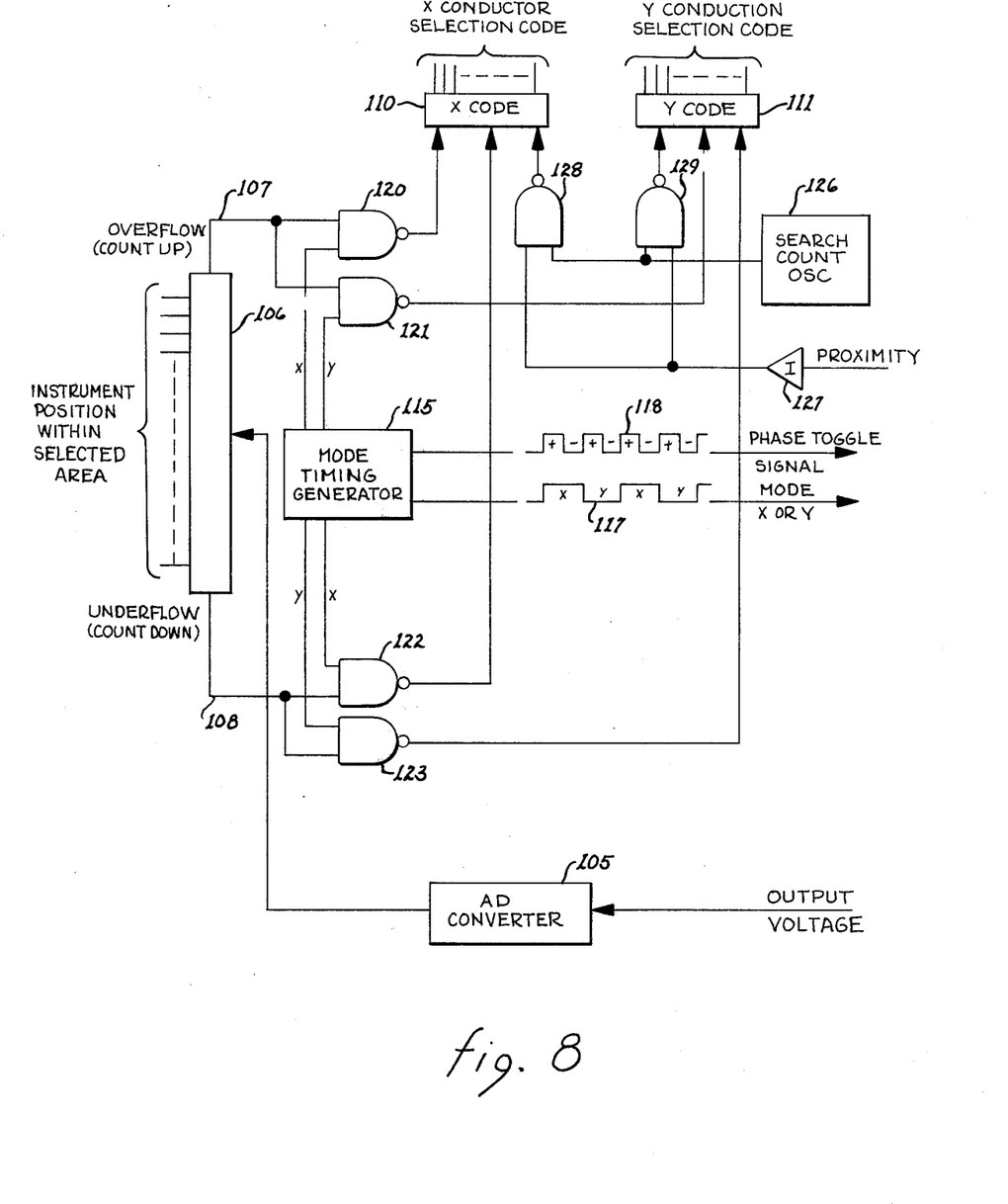
FIG. 8 is a schematic diagram showing the generation of digital signals utilized in the selection of a conductor set.

Referring now to FIG. 8, the output voltage derived from the output of the lowpass filter 52 of FIG. 7 is applied to an analog-to-digital convertor 105 where it is converted to a twelve-bit code; in the embodiment chosen for illustration, the chosen code is a binary coded decimal yielding positions 0–999 to thereby indicate the position of the instrument along one of the orthogonal axes of the active area to within 1/1000th of an inch. The digital output of the analog-to-digital convertor 105 is applied to register 106. When the output voltage applied to the analog-to-digital convertor results in a digital code that exceeds 999, an overflow signal is provided by the register to conductor 107; similarly, if the analog signal results in a digital code that is below 0, an underflow signal is applied from the register 106 to the conductor 108. At any instant of time, the contents of the register 106 is a binary coded decimal representation of the position of the instrument along one of the orthogonal axes of the active area. The address of the active area on the writing table is determined in accordance with the contents of the up-down counters 110 and 111. Counter 110 contains the code for the position of the X conductor set while counter 111 contains the code of the Y conductor set.

Since the codes contained in the counters 110 and 111 represent the address of sets of conductors, and since the sets of conductors define an active area, the codes contained in the counters therefor represent the address of the active area. A timing mode generator 115 provides an output mode signal as well as a phase toggle signal as shown at 117 and 118, respectively. The output mode signal simply provides gating levels timed for switching the application of signals from the X conductors to the Y conductors and vice-versa. During the signal level for which a particular mode may be active (for example, mode X) the phase toggle signal will reverse its level so that the leading and lagging phase signals can be reversed. Therefore, during each period of the mode signal, the phase of the signals being applied to the conductors will have the phase signals reversed. The phase toggle signal and the mode signal, shown in FIG. 8, is applied where shown to the system in FIG. 7. The mode timing generator 115 also applies the mode signals to gates 120–123.

If the register 106 overflows, the overflow signal occurring on conductor 107 is passed through either the gate 120 or the gate 121 depending on whether or not the mode is currently X or Y. If the system is operating in the X mode at the time of the overflow, the "countup" signal is applied to the counter 110 to upcount the X portion of the address of the active area. If the register 106 underflows, the countdown signal applied to the conductor 108 is passed through the gate 122 (assuming operation in the mode X) to the register 110 to cause the latter to countdown. Similarly, the countup and countdown signals are applied through gates 121 and 123, respectively to the Y code counter 111. If the instrument is moved toward one extreme edge thereof, the register 106 will increase or decrease the binary coded decimal therein (depending on the direction that the instrument is moved) until an overflow or underflow condition obtains. At that time, the corresponding counter 110 or 111 will upcount or downcount to thereby select the adjacent area as the new active area. If the instrument is not on the writing table, and if it is not in sufficient proximity so that it can detect the electric field existing on the table, the counters 110 and 111 begin counting in a search mode through the application of a search count signal derived from a search count oscillator 126. The search count oscillator 126 produces a counting pulse output that may be applied to the counters 110 and 111 to cause the latter to count rapidly until feedback from the instrument is detected by the system. The initial signal derived from the instrument operates as the proximity signal which may be inverted as shown at 127 and applied to gates 128 and 129. Thus, when a proximity signal is present, the gates 128 and 129 inhibit the application of the count signal from the search count oscillator 126; conversely, in the absence of a proximity signal, the inverter 127 applied a gating signal to gates 128 and 129 to permit the pulses from the search count oscillator 126 to be applied to the counters 110 and 111 and thus permit the latter to "search" until an active area is located beneath the instrument. While the embodiment chosen for illustration has incorporated a separate search count oscillator 126, it will be apparent to those skilled in the art that the counting pulses derived therefrom could just as easily be provided by the timing mode generator 115; or by other repetitive pulse sources that may be found throughout the system. It is important only to be certain that the frequency of the search counts does not exceed capacity of the counters 110 and 111. The speed with which the counters 110 and 111 "search" the surface of the writing table result in the "acquisition" of the instrument position in a short enough time that it becomes almost impossible for the instrument to be moved manually rapidly enough to "outrun" the system.

The output of the overall system then comprises a binary coded decimal indicating, to within 1/1000th of an inch, the location of the instrument within an active area and a binary code representing the address of the active area on the writing table. The output would alternate between the address of the instrument on one axis and the address of the instrument on the other axis of the orthogonal axes of the writing table. The tolerances provided by the system of the present invention are independent of the writing table size. The utilization of five conductors per inch readily permits the defining of an instrument position within 1/1000th of an inch. The same voltage control oscillator, the same closed loop, and the same phase shifting elements are utilized for all of the active areas throughout the writing table; therefore, each of the active areas is identical to every other active area. The boundaries between adjacent active areas are located with the same precision as the precision with which the instrument can be located. That is, the boundary is defined as that location where the binary coded decimal derived from the analog-to-digital convertor exceeds the predetermined size of the register 106. Thus, an instrument being moved from one active area to an adjacent active area would pass over the boundary between the two active areas to a tolerance equal to the tolerance with which the instrument can be located. If an error is present as a result of the analog-to-digital conversion, the same error would be imposed on all of the active areas; under these circumstances, all active areas may shift in their absolute position but will not shift in their relative position. This adaptive feature eliminates errors that might be introduced into the convertor through environmental factors. Thus, when the writing table is first constructed, the entire table may be aligned by simply aligning a single active area; all other active areas will automatically follow the alignment of the selected active area. The adaptive feature resulting from the system of the present invention significantly reduces the cost of manufacturing writing tables of the type described since it is only necessary to align one of the areas rather than align all of the areas. The latter feature alone can amount to a saving of over ninety percent of the cost of aligning a writing table during manufacture.

What is claimed is:

1. Apparatus for obtaining an electrical signal corresponding to the position of an instrument along an axis on a surface having a plurality of conductors orthogonally oriented with respect to said axis and positioned proximate said surface, said apparatus comprising in combination:
   a. means for generating a first signal having a predetermined frequency and phase;
   b. means for advancing the phase of said first signal to generate a second signal having the predetermined frequency and a phase leading said first signal;
   c. means for retarding the phase of said first signal to generate a third signal having the predetermined frequency and a phase lagging said first signal;
   d. means for selecting an active area on said surface, said area including the position of said instrument, and for generating a time varying electrostatic field across said active area by applying said first signal to a first of said conductors proximate said active area, applying said second signal to a second of said conductors proximate said active area, and applying said third signal to a third of said conductors proximate said active area.
   e. means for sensing the phase and frequency of the time varying electrostatic field at the position of the instrument and generating a control signal in response thereto having said predetermined frequency and a phase unique to said position;
   f. means for comparing said control signal to said first signal;
   g. means for changing the predetermined frequency until a first stable condition is reached in which said control signal compares to said first signal in accordance with a predetermined relationship;
   h. means for producing a first output signal representative of said first stable condition;
   i. means for reversing said second signal and said third signal to apply said second signal to said third conductor and said third signal to said second conductor, thereby changing the electrostatic field at the position of the instrument;
   j. means for sensing the changed electrostatic field and changing said control signal in response thereto;
   k. means for changing the predetermined frequency until a second stable condition is reached in which said changed control signal compares to said first signal in accordance with said predetermined relationship.
   l. means for producing a second output signal representative of said second stable condition; and
   m. means for combining said first output signal with said second output signal to obtain a differential output signal uniquely corresponding to the position of the instrument on the surface.

2. The apparatus set forth in claim 1 wherein said means for selecting an active area comprises:
   a. means for generating a digital address code, each address code identifying an active area
   b. gating means connected to each of said conductors responsive to said digital address code for gating said first, second, and third signals to said conductors proximate said active area.

3. The apparatus set forth in claim 1 wherein said means for selecting an active area comprises:
   a. means for generating a proximity signal when said instrument is proximate said surface
   b. a search count means for generating search count signals
   c. a counter for generating digital addresses each addition identifying an active area, said counter connected to said search count means and responsive to said search count signals for generating successive addresses
   d. means responsvie to said proximity signal for inhibiting the application of said search count signals to said counter.

4. Apparatus for obtaining an electrical signal corresponding to the position of an instrument on a surface having a plurality of orthogonally oriented conductors positioned proximate said surface, said apparatus comprising in combination:
   a. means for generating a first signal having a predetermined frequency and phase;
   b. means for advancing the phase of said first signal to generate a second signal having the predetermined frequency and a phase leading said first signal;
   c. means for retarding the phase of said first signal to generate a third signal having the predetermined frequency and a phase lagging said first signal;
   d. means for selecting an active area on said surface, said area including the position of said instrument, and for generating a time varying electrostatic field across said active area by applying said first signal to a first of said conductors proximate said active area, applying said second signal to a second of said conductors proximate said active area, and applying said third signal to a third of said conductors proximate said active area.
   e. means for sensing the phase and frequency of the time varying electrostatic field at the position of the instrument and generating a control signal in response thereto having said predetermined frequency and a phase unique to said position;

f. means for comparing said control signal to said first signal;

g. means for changing the predetermined frequency until a first stable condition is reached in which said control signal compares to said first signal in accordance with a predetermined relationship;

h. means for producing a first output signal representative of said first stable condition;

i. means for reversing said second signal and said third signal to apply said second signal to said third conductor and said third signal to said second conductor, thereby changing the electrostatic field at the position of the instrument;

j. means for sensing the changed electrostatic field and changing said control signal in response thereto;

k. means for changing the predetermined frequency until a second stable condition is reached in which said changed control signal compares to said first signal in accordance with said predetermined relationship;

l. means for producing a second output signal representative of said second stable condition;

m. means for combining said first output signal with said second output signal to obtain a differential output signal uniquely corresponding to the position of the instrument along one axis on the surface; and n. switching means for switching said first, second, and third signals from said conductors proximate said active area and corresponding to said one axis of the orthogonal orientation to conductors proximate said active area and corresponding to the other axis of the orthogonal orientation to obtain another differential output signal indicative of the instrument position relative to the other axis.

5. The apparatus set forth in claim 4 wherein said means for selecting an area comprises:

a. means for generating a digital address code, said address code identifying an active area b. gating means connected to each of said conductors responsive to said digital address code for gating said first, second, and third signals to said conductors proximate said active area.

6. The apparatus set forth in claim 4 wherein said means for selecting an active area comprises:

a. means for generating a proximity signal when said instrument is proximate said surface b. a search count means for generating search count signals c. a counter for generating digital addresses each addition identifying an active area, said counter connected to said search count means and responsive to said search count signals for generating successive addresses d. means responsive to said proximity signal for inhibiting the application of said search count signals to said counter.

7. A method for obtaining an electrical signal corresponding to the position of an instrument along an axis on a surface having a plurality of conductors orthogonally oriented with respect to said axis and positioned proximate said surface, said method comprising the steps of:

a. generating a first signal having a predetermined frequency and phase;

b. advancing the phase of said first signal to generate a second signal having the predetermined frequency and a phase leading said first signal;

c. retarding the phase of said first signal to generate a third signal having the predetermined frequency and a phase lagging said first signal;

d. selecting an area on said surface within which said instrument is positioned e. generating a time varying electrostatic field across said selected area by applying said first signal to a first conductor proximate said selected area, applying said second signal to a second of said conductors proximate said selected area, and applying said third signal to a third of said conductors proximate said selected area f. sensing the phase and frequency of the time varying electrostatic field at the position of the instrument and generating a control signal in response thereto having said predetermined frequency and a phase unique to said position;

g. comparing said control signal to said first signal;

h. changing the predetermined frequency until a first stable condition is reached in which said control signal compares to said first signal in accordance with a predetermined relationship;

i. producing a first output signal representative of said first stable condition;

j. reversing said second signal and said third signal to apply said second signal to said third conductor and said third signal to said second conductor, thereby changing the electrostatic field at the position of the instrument;

k. sensing the changed electrostatic field and changing said control signal in response thereto;

l. changing the predetermined frequency until a second stable condition is reached in which said changed control signal compares to said first signal in accordance with said predetermined relationship;

m. producing a second output signal representative of said second stable condition; and n. combining said first output signal with said second output signal to obtain a differential output signal uniquely corresponding to the position of the instrument on said axis.

8. A method for obtaining an electrical signal corresponding to the position of an instrument on a surface having a plurality of orthogonally oriented conductors positioned proximate said surface, said method comprising the steps of:

a. generating a first signal having a predetermined frequency and phase;

b. advancing the phase of said first signal to generate a second signal having the predetermined frequency and a phase leading said first signal;

c. retarding the phase of said first signal to generate a third signal having the predetermined frequency and a phase lagging said first signal;

d. selecting an area on said surface within which said instrument is positioned e. generating a time varying electrostatic field across said selected area by applying said first signal to a first conductor proximate said selected area, applying said second signal to a second of said conductors proximate said selected area, and applying said third signal to a third of said conductors proximate said selected area.
f. sensing the phase and frequency of the time varying electrostatic field at the position of the instrument and generating a control signal in response thereto having said predetermined frequency and a phase unique to said position;
g. comparing said control signal to said first signal;
h. changing the predetermined frequency until a first stable condition is reached in which said control signal compares to said first signal in accordance with a predetermined relationship;
i. producing a first output signal representative of said first stable condition;
j. reversing said second signal and said third signal to apply said second signal to said third conductor and said third signal to said second conductor, thereby changing the electrostatic field at the position of the instrument;
k. sensing the changed electrostatic field and changing said control signal in response thereto;
l. changing the predetermined frequency until a second stable condition is reached in which said changed control signal compares to said first signal in accordance with said predetermined relationship;
m. producing a second output signal representative of said second stable condition;
n. combining said first output signal with said second output signal to obtain a differential output signal uniquely corresponding to the position of the instrument along an axis on the surface, and
o. then applying said first, second, and third signals to conductors associated with the other axis of the orthogonal orientation to obtain another differential output signal indicative of the instrument position relative to the other axis.

* * * * *